United States Patent
Tang

(10) Patent No.: US 7,522,398 B2
(45) Date of Patent: Apr. 21, 2009

(54) METHOD AND APPARATUS FOR OVERCURRENT PROTECTION IN DC-DC POWER CONVERTERS

(75) Inventor: Ning Tang, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 456 days.

(21) Appl. No.: 11/175,833

(22) Filed: Jul. 6, 2005

(65) Prior Publication Data
US 2007/0008748 A1     Jan. 11, 2007

(51) Int. Cl.
*H02H 9/00*     (2006.01)
(52) U.S. Cl. ..................................... 361/93.9
(58) Field of Classification Search .............. 361/93.9
See application file for complete search history.

(56) References Cited

U.S. PATENT DOCUMENTS

| 6,157,182 A | 12/2000 | Tanaka et al. | |
| 6,324,038 B1 * | 11/2001 | Kishibe et al. | ................ 361/31 |
| 6,618,711 B1 | 9/2003 | Ananth | |
| 6,674,272 B2 * | 1/2004 | Hwang | ........................ 323/284 |
| 2006/0149499 A1 * | 7/2006 | Ribeiro et al. | .............. 702/176 |

* cited by examiner

*Primary Examiner*—Stephen W Jackson
*Assistant Examiner*—Ann T Hoang
(74) *Attorney, Agent, or Firm*—John J. Patti; Wade J. Brady, III; Frederick J. Telecky, Jr.

(57) ABSTRACT

A controller and method for a switched-mode power converter adaptively provides overcurrent protection by detecting a current in the power converter exceeding a current limit during substantially a minimum on time of a power switch. A count N is computed for the number of consecutive active switching cycles that a current exceeds a current limit during substantially the minimum on time of the power switch. Conduction of the power switch is inhibited for a number of cycles that is a function of the count N, which is an increasing function of N. The function of the count N is preferably the function $2^N-1$. The count N is reset to zero if the current in the power converter does not exceed the current limit substantially during the minimum on time of the power switch. The controller can be easily implemented with a digital integrated circuit for a wide range of applications.

15 Claims, 4 Drawing Sheets

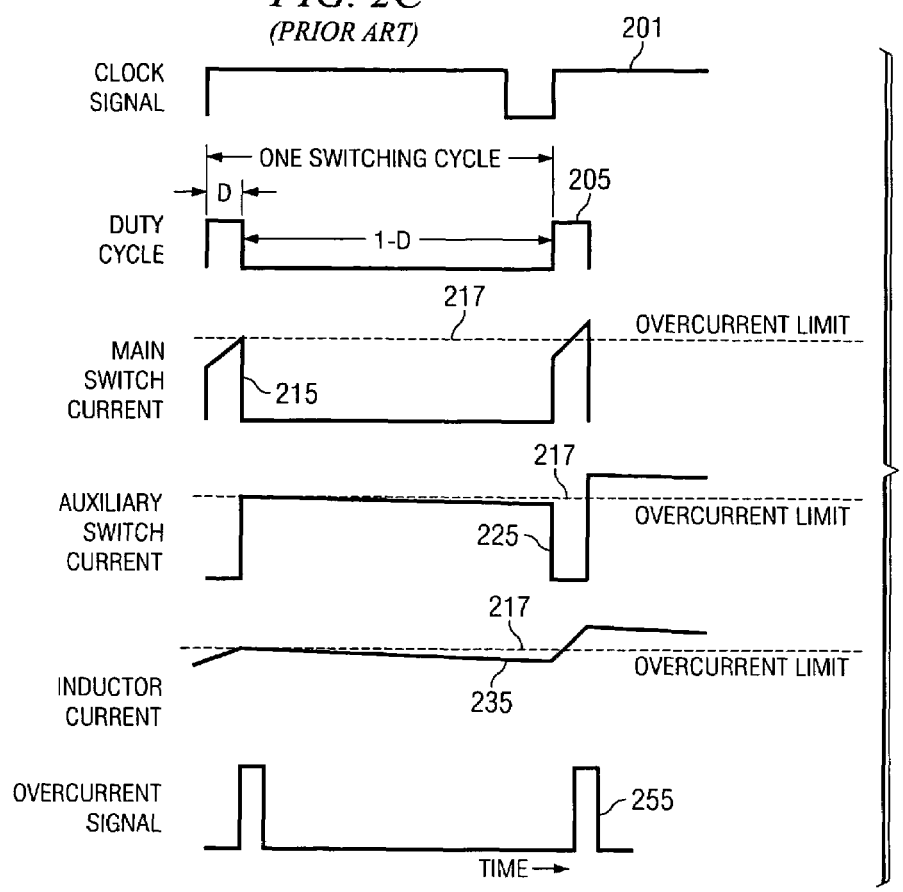
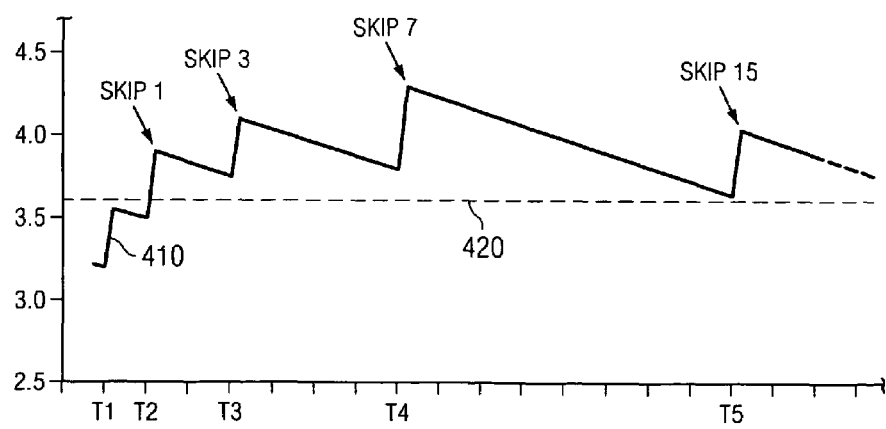

METHOD AND APPARATUS FOR OVERCURRENT PROTECTION IN DC-DC POWER CONVERTERS

TECHNICAL FIELD

This invention relates generally to power converter circuits, and in particular, to a method and implementation of a control circuit for a switched-mode power converter that provides overcurrent protection.

BACKGROUND

A switched-mode power converter (also referred to as a "power converter") is an electronic power processing circuit that converts an input voltage waveform into an output voltage waveform, both typically but not necessarily dc waveforms, by periodically switching power switches coupled to an inductive circuit element. The power switches are controlled with a conduction period referred to as a "duty cycle." The duty cycle is a ratio represented by the conduction period of a power switch to a switching period thereof. Thus, if a power switch conducts for half of the switching period, the duty cycle for the power switch would be 0.5 (or 50 percent). Feedback controllers associated with power converters manage an operation thereof by controlling the conduction periods of power switches employed therein. Generally, a feedback controller is coupled to an output of a power converter in a feedback loop configuration (also referred to as a "control loop" or "closed control loop") to regulate an output characteristic of the power converter circuit such as an output voltage.

Typically, a feedback controller measures an output characteristic of the power converter circuit, and based thereon, modifies the duty cycle of the power switches of the power converter circuit. Additionally, as the need for systems such as a microprocessor or other load powered by the power converter dynamically change (e.g., as a computational load on the microprocessor changes), the feedback controller should be configured to dynamically increase or decrease the duty cycle of the power switches therein to maintain the output characteristic at a desired value.

FIG. 1 is a simplified schematic diagram of an exemplary step-down switching regulator circuit of the prior art. Step-down switching regulators are power converters that convert a dc input voltage to a lower dc output voltage, usually without dc isolation therebetween. While the power converter illustrated employs a non-isolated, buck, switching regulator topology, those skilled in the art should understand that other converter topologies such as an isolated forward or flyback converter topology can be employed to convert an input voltage to an output voltage, and include converters that step up or step down an output voltage to a voltage level higher or lower than the input voltage. Such converters are well known in the art and exemplary circuit drawings will not be illustrated or described in the interest of brevity.

The buck switching regulator circuit illustrated in FIG. 1 receives a dc input voltage $V_{in}$ from a source of electrical power (represented in the figure by the battery 105) at an input thereof and typically provides a regulated output voltage $V_{out}$ to power, for instance, a microprocessor coupled to an output of the switching regulator. In keeping with the principles of a buck converter topology, the output voltage $V_{out}$ is generally less than the input voltage $V_{in}$ such that a switching operation of the power converter can regulate the output voltage $V_{out}$. A main power switch $Q_{main}$ (e.g., a field-effect transistor) is enabled to conduct for a primary interval (generally co-existent with a primary duty cycle "D" of the main power switch $Q_{main}$ as produced by a controller, not shown) and couples the input voltage $V_{in}$ to an output filter inductor $L_{out}$. During the primary interval, an inductor current $I_{Lout}$ flowing through the output filter inductor $L_{out}$ increases as a current flows from the input to the output of the power converter. An ac component of the inductor current $I_{Lout}$ is filtered by the output capacitor $C_{out}$.

During a complementary interval (generally co-existent with a complementary duty cycle "1−D" of the main power switch $Q_{main}$, also as produced by a controller, not shown), the main power switch $Q_{main}$ is transitioned to a non-conducting state and an auxiliary power switch $Q_{aux}$ (e.g., a freewheeling field-effect transistor or freewheeling diode) is enabled to conduct. The auxiliary power switch $Q_{aux}$ provides a conductive path to maintain a continuity of the inductor current $I_{Lout}$ flowing through the output filter inductor $L_{out}$. During the complementary interval, the inductor current $I_{Lout}$ flowing through the output filter inductor $L_{out}$ decreases. In general, the duty cycle of the main and auxiliary power switches $Q_{main}$, $Q_{aux}$ may be adjusted by a feedback controller to maintain a regulation of the output voltage $V_{out}$ of the power converter. Those skilled in the art should understand, however, that the conduction periods for the main and auxiliary power switches $Q_{main}$, $Q_{aux}$ may be separated by a small time interval to avoid cross conduction therebetween and beneficially to reduce the switching losses associated with the power converter.

FIG. 2A depicts waveforms of the circuit in FIG. 1 under normal operating conditions. An oscillator establishes the period of a switching cycle with a clock waveform such as the clock waveform 201. A feedback controller produces a duty-cycle controlling signal 205 with a conduction period D for the main switch $Q_{main}$. During the conduction period D, the load current 215 flowing through the main power switch $Q_{main}$, increases at a rate substantially proportional to the voltage difference between the input voltage and the output voltage. During the complementary period 1−D, the load current 225 flows through the auxiliary power switch $Q_{aux}$, and decreases at a rate substantially proportional to the output voltage of the power converter. The current through the output inductor is the sum of the currents 215 and 225, and is shown as the inductor current waveform 235. The dc load current level is illustrated by the dotted lines 245 in FIG. 2A.

In practical applications of power converters, it is generally necessary to sense the output current delivered to the load or another current such as a power switch current internal to the power converter and to responsively modulate or disable the operation of the power converter if the output current or the other sensed current exceeds a design or other limiting value. A current that exceeds a design value, referred to as an overcurrent condition, can damage the power converter, load circuit elements, or even the interconnecting wiring therebetween. An overcurrent condition can be caused, for example, by an unexpected operation of the load circuit, a blown or damaged circuit component, or an improper external connection to the circuit such as a misapplication of a test instrument.

It is also generally necessary to protect against an overcurrent condition during startup of the power converter. During startup, output filter capacitors, such as the filter capacitor $C_{out}$ illustrated in FIG. 1 and any additional filtering capacitors that may be coupled to the load, draw substantial current as the output voltage increases, typically from a discharged voltage level to a regulated voltage level. The current required to charge the capacitors coupled across the output terminals of the power converter is substantially proportional to the summed capacitance of the capacitors coupled across the output, and substantially inversely proportional to the length of the time interval during which the output voltage is raised to the required voltage level. Conflicting requirements in system designs that include power converters typically limit an output current to a limiting value to protect circuit components, but also require that the output voltage be brought to a regulated voltage level in as short a time interval as possible. An ideal power converter design for startup in view of these requirements would provide an output current substantially at the maximum, limiting current level.

In circuit designs for overcurrent protection in prior-art switched-mode power converters, current in a power-converter power switch is typically monitored. Monitoring schemes include monitoring power switch current when the power switch is turned on, or alternatively, current in a circuit element in the output portion of the circuit such as an output filter inductor. When an overcurrent condition is detected in the prior-art, a power switch is turned off for the remainder of the switching cycle in which the overcurrent condition was sensed.

FIG. 2B depicts waveforms of the circuit in FIG. 1 with the addition of a process to monitor the current in the main power switch and to terminate main power switch conduction, i.e., the duty cycle, when the current 215 in the main power switch exceeds an overcurrent limit 217. Waveforms in FIG. 2B that correspond to waveforms in FIG. 2A with the same reference designations will not be redescribed. When the current 215 in the main power switch exceeds an overcurrent limit, an overcurrent signal 255 is generated to terminate the duty cycle before its termination by the feedback controller, and the inductor current then declines at a rate substantially proportional to the output voltage.

An overcurrent protection arrangement such as described above can be effective to protect circuit elements for a range of operating conditions. However, particularly for cases of low output voltage during startup or for a low-impedance fault coupled across the output of the power converter, the very short power converter duty cycle required to control the overcurrent condition may result in a runaway condition for power switch current. The runaway condition is a consequence of the finite time required to turn a semiconductor switch on or off, resulting in a minimum effective duty cycle for the power switch, particularly for power converter circuits with a switching frequency exceeding 100 kHz. The runaway condition can also occur for a buck switching regulator circuit that converts a high input voltage, such as a voltage of 15 volts or more to a low output voltage such as a voltage of 3.3 volts or less, which inherently requires a short duty cycle during normal operation. In buck-type switching regulators, duty cycle is roughly the ratio of output voltage to input voltage.

FIG. 2C depicts waveforms of the circuit in FIG. 1, including an overcurrent limit 217 and an overcurrent signal 255. FIG. 2C illustrates an overcurrent condition for a low output voltage caused by a low-impedance fault coupled across the output or during startup, both of which produce a low output voltage. The duty cycle D is illustrated in FIG. 2C at a minimum value. The main power switch current increases until it reaches the overcurrent limit, which produces the overcurrent signal 255 that terminates the duty cycle. The inductor current, which flows through the auxiliary power switch during the complementary duty cycle 1−D, decreases only slightly due to the low output voltage. The clock signal eventually initiates a new switching cycle for the power converter. The main power switch current then starts at a value near the overcurrent limit, and exceeds the overcurrent limit before the following duty cycle can be terminated. In this manner, the current in the output inductor, which supplies the output current, increases from cycle to cycle, resulting in a runaway current condition for the power converter.

Another control scheme to control an overcurrent condition is described in Wilcox, et al., in U.S. Pat. No. 5,481,178. The Wilcox patent is directed toward a switching regulator circuit wherein the operation of two active power switches is intermittently disabled at low load current when a charge in an output filtering capacitor is sufficient to maintain a regulated output voltage during a power switch disabling interval. Wilcox, et al., recognize that the normal, periodic operation of a power switch in a switched-mode power converter is a process that contributes to circuit inefficiency. The control arrangement they describe, while increasing power conversion efficiency at light loads by intermittently disabling power switches when output current is low, fails to control an output current under a low-impedance fault condition (high output current) or during startup.

A further scheme in the prior art to provide overcurrent protection is operation of a power converter in a hiccup mode. A hiccup mode shuts down the switched-mode power converter for a pre-set, fixed time period when an overcurrent condition is detected. Such designs, which work over a limited range of operating conditions, carry a risk of the power converter output not reaching the required output voltage at startup because the resulting output inductor current with hiccup operation is insufficient to supply the required startup load current with this control method.

A principal limitation of the prior-art circuits is thus inability to adaptively respond to an output overcurrent condition over a range of possible fault conditions encountered during operation of the power converter circuit, particularly for low-impedance faults coupled across the output terminals of the power converter, and during power converter startup with substantial capacitance coupled across the output terminals. In addition, overcurrent protection schemes of the prior art generally are not configured for easy implementation in an integrated circuit. Furthermore, the complex relationships among system parameters including components externally added to the power distribution arrangement generally require substantial analysis before implementation of a cost-effective, flexible overcurrent protection process in an integrated circuit. A need thus exists for an improved overcurrent protection scheme that can prevent output current from exceeding a design limit for a wide range of operating conditions, can reliably provide sufficient current for startup with a range of loads, can straightforwardly be implemented with digital control logic, can adaptively provide overcurrent protection with minimal design effort, and can start up a power converter in a substantially minimal time.

SUMMARY OF THE INVENTION

Embodiments of the present invention achieve technical advantages as an overcurrent protection scheme for a power converter. The overcurrent protection scheme includes a controller for a switched-mode power converter that detects a current in the power converter exceeding a current limit during substantially a minimum on time of a power switch. In a preferred embodiment, the switched-mode power converter is a step-down buck regulator. In a preferred embodiment, a count N is provided of the number of consecutive times that the current in the power converter exceeds the current limit during substantially the minimum on time of the power switch. Conduction of the power switch in the switched-mode power converter is then inhibited for a number of cycles that is a function f(N) of the count N. The function f(N) is an increasing function of the count N. In a preferred embodiment, the function f(N) is the function $2^N-1$. The count N is reset to a starting value if the current in the power converter in a succeeding switching cycle does not exceed the current limit substantially during the minimum on time of the power switch. The count N may be reset to a starting value of zero or another constant depending on the logic of the overcurrent protection scheme when the current in a succeeding switching cycle does not exceed the current limit substantially during the minimum on time of the power switch. In a further embodiment, the controller is implemented with an integrated circuit.

In accordance with another preferred embodiment of the present invention, switched-mode power converter includes a controller to provide overcurrent protection. The controller for a switched-mode power converter detects a current in the power converter exceeding a current limit during substantially a minimum on time of a power switch. In a preferred embodiment, the switched-mode power converter is a step-down buck regulator. In a preferred embodiment, a count N is provided of the number of consecutive times that the current in the power converter exceeds the current limit during substantially the minimum on time of the power switch. Conduction of the power switch in the switched-mode power converter is then inhibited for a number of cycles that is a function f(N) of the count N. The function f(N) is an increasing function of the count N. In a preferred embodiment, the function f(N) is the function $2^N-1$. The count N is reset to a starting value if the current in the power converter in a succeeding switching cycle does not exceed the current limit substantially during the minimum on time of the power switch. The count N may be reset to a starting value of zero or another constant depending on the logic of the overcurrent protection scheme when the current in a succeeding switching cycle does not exceed the current limit substantially during the minimum on time of the power switch. In a further embodiment, the controller is implemented with an integrated circuit.

Another embodiment of the present invention is a method of constructing a controller for a switched-mode power converter that detects a current in the power converter exceeding a current limit during substantially a minimum on time of a power switch. In a preferred embodiment, the method includes designing the switched-mode power converter as a step-down buck regulator. In a preferred embodiment, the method includes computing a count N of the number of consecutive times that the current in the power converter exceeds the current limit during substantially the minimum on time of the power switch. The method further includes inhibiting conduction of the power switch in the switched-mode power converter for a number of cycles that is a function f(N) of the count N. In a preferred embodiment, the function f(N) is selected to be an increasing function of the count N. In a further preferred embodiment, the function f(N) is selected to be the function $2^N-1$. The method includes resetting the count N to a starting value if the current in the power converter in a succeeding switching cycle does not exceed the current limit substantially during the minimum on time of the power switch. In a preferred embodiment, the method includes resetting the count N to a starting value of zero or another constant depending on the logic of the overcurrent protection scheme when the current in a succeeding switching cycle does not exceed the current limit substantially during the minimum on time of the power switch. In a further embodiment, the method includes implementing the controller with an integrated circuit.

The invention solves the overcurrent protection problem for severe overloads on a power converter and during startup by skipping a number of switching cycles, the number of switching cycles skipped depending on the number of consecutive times that an overcurrent condition is detected during a minimum on time for a power switch.

Embodiments of the present invention achieve technical advantages as an overcurrent protection scheme that is operable over a wide range of power converter operating conditions. Advantages of embodiments of the present invention include a controller for a power converter that can easily be implemented as an integrated circuit using low-cost and highly compact digital logic.

BRIEF DESCRIPTION OF THE DRAWINGS

For a more complete understanding of the present invention, and the advantages thereof, reference is now made to the following descriptions taken in conjunction with the accompanying drawings, in which:

FIGS. 2A, 2B, and 2C illustrate waveforms of the circuit illustrated in FIG. 1;

FIG. 4 illustrates an inductor current waveform for a power converter circuit including an embodiment of a dynamic frequency shift overcurrent protection process of the present invention;

DETAILED DESCRIPTION OF ILLUSTRATIVE EMBODIMENTS

Figure 1:
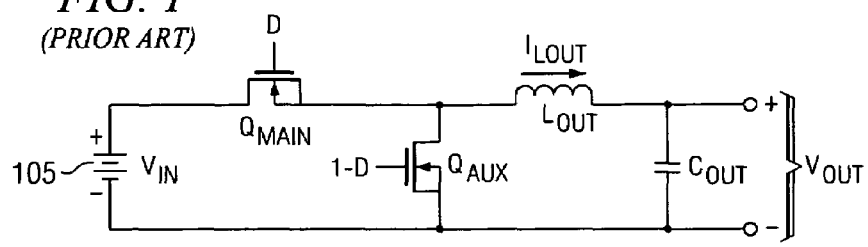
FIG. 1 illustrates a step-down switching regulator of the prior art.
Figure 2B:
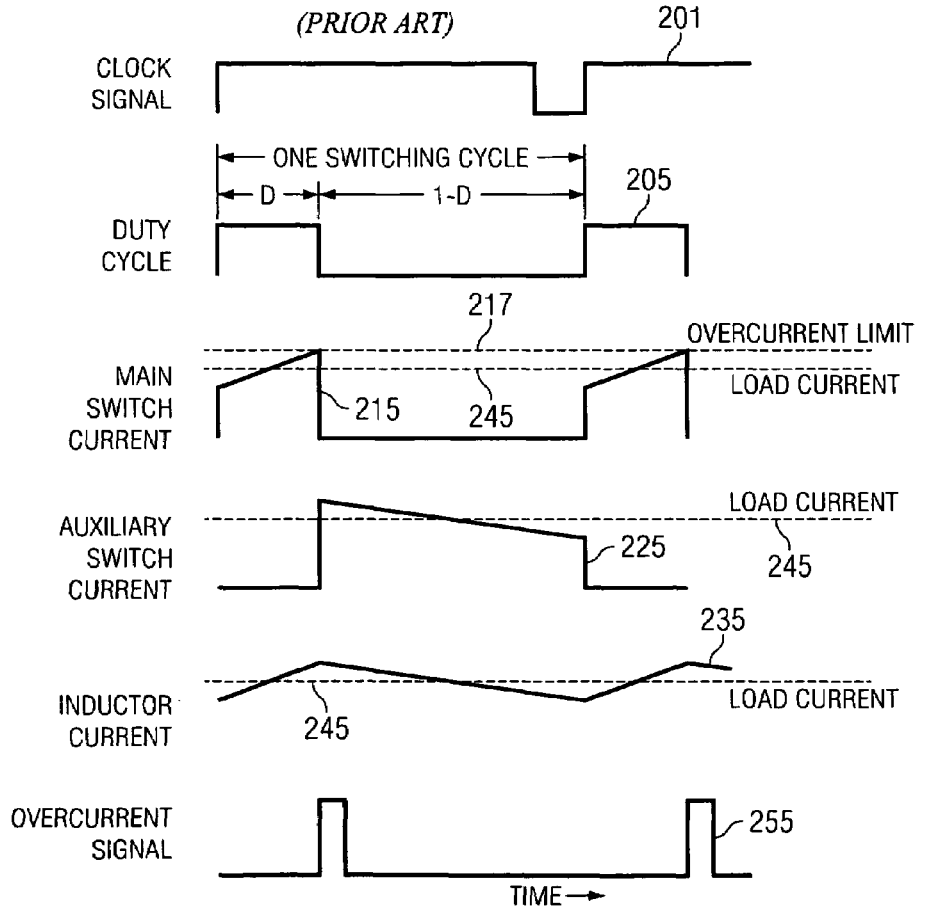
Figure 2A:
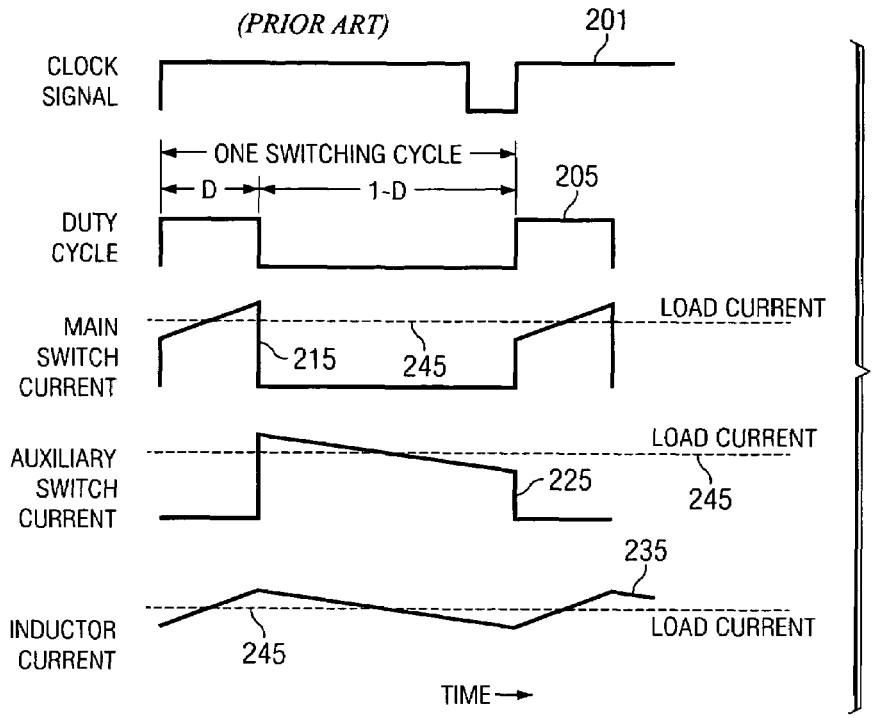

The making and using of the presently preferred embodiments are discussed in detail below. It should be appreciated, however, that the invention provides many applicable inventive concepts that can be embodied in a wide variety of specific contexts. The specific embodiments discussed are merely illustrative of specific ways to make and use the invention, and do not limit the scope of the invention.

Embodiments of the invention will be described with respect to preferred embodiments in a specific context, namely a dc-dc power converter with dynamic frequency shift for overcurrent protection.

Alternative embodiments include isolated and non-isolated power converters, and power converters that step up or step down the input voltage to a higher or lower output voltage.

Preferred embodiments of the invention provide overcurrent protection employing at least two steps. In a first step of a preferred embodiment to providing overcurrent protection, an overcurrent condition in a power switch is detected while the power switch is on, i.e., when it is enabled to conduct during a switching cycle. This step can be performed by detecting a voltage across a main power switch such as a MOSFET power switch, and comparing the voltage across the power switch to a voltage threshold using a comparator. Alternatively, a current sense transformer in series with a power switch can be used with a resistor and other necessary components coupled to a secondary winding of the current sense transformer to sense a power switch current. Further alternative current-sensing means within the broad scope of the present invention include resistors and Hall effect devices that are well known in the art.

In a second step of a preferred embodiment, a dynamic frequency shift overcurrent protection process is enabled if the overcurrent condition is detected during a minimum on time for the power switch. If the overcurrent condition was detected substantially after the minimum on time for a power switch, for example, after more than 20 ns after the minimum on time for a power switch in a 500 kHz power converter, the dynamic frequency shift overcurrent protection process is not enabled. The minimum on time for a power switch employed in a 500 kHz power converter may typically be in the range of 100-200 ns.

When the dynamic frequency shift overcurrent protection process is enabled, it disables turning on a main power switch during at least the subsequent switching cycle. In a preferred embodiment, the number of consecutive times that the dynamic frequency shift process is enabled is counted. If the process is not enabled for one cycle, i.e., an overcurrent condition is not detected substantially during a minimum on time for a main power switch, then the consecutive count of enablement times is reset to zero or other appropriate value that may be necessary to accommodate control logic in the overcurrent protection process.

If the dynamic frequency shift overcurrent protection process is enabled N consecutive times, then a main power switch is not turned on for a number of cycles determined by a function f(N) that depends on the consecutive enablement count. The function f(N) is a positive function that increases with the increasing consecutive enablement count N. Preferably, the function f(N) is the function $2^N-1$. Other preferred functions for the function f(N) include without limitation the function 2·N−1 and the function N. The function f(N) using the preferred function $2^N-1$ or another function may be modified such as by an additive constant to accommodate control logic in the overcurrent protection process.

Figure 3:
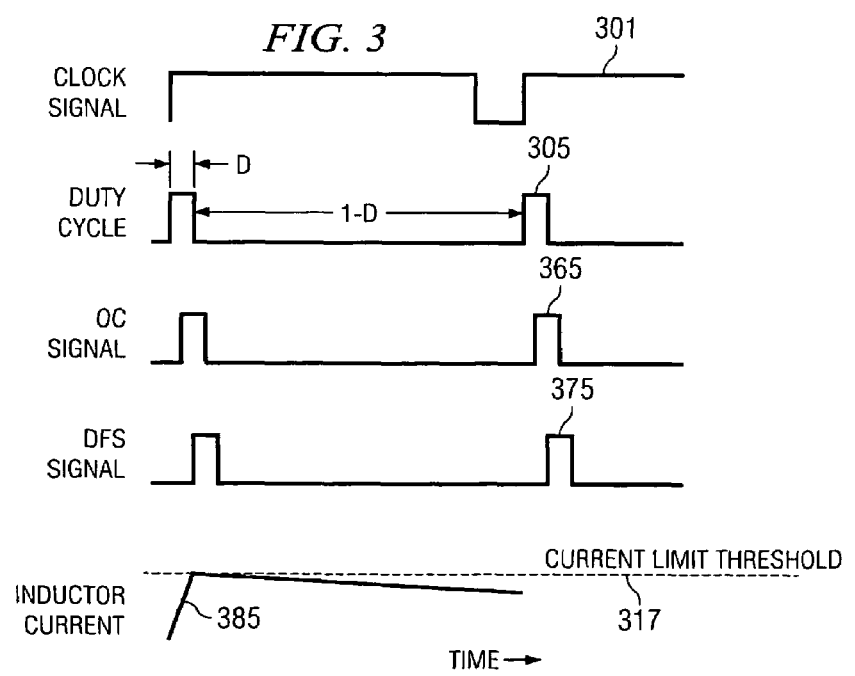
FIG. 3 illustrates waveforms for a power converter circuit including an embodiment of a dynamic frequency shift process of the present invention.

FIG. 3 illustrates waveforms generated by a step-down switching regulator controlled with dynamic frequency shift overcurrent protection in a preferred embodiment. A clock signal 301 establishes the period of the switching cycle of the power converter. The waveform 305 represents the power converter operating at a minimum duty cycle. The waveform 365 represents an overcurrent signal that may be detected during a minimum on time of the main power switch, and the dynamic frequency shift signal (dfs) 375 represents detection of the overcurrent signal during the minimum on time of the main power switch. The waveform 385 represents the current in the output inductor. The dotted line 317 represents the overcurrent limit.

Turning now to FIG. 4, illustrated is a waveform of inductor current in a dc-dc converter in a preferred embodiment with a low output voltage, either during start up, or resulting from a low-impedance fault coupled across the output terminals of the power converter. The overcurrent limit 420 in this example is 3.6 amperes. At time T1 the main power switch is turned on, and the inductor current 410 increases. The inductor current does not exceed 3.6 amperes, particularly during a minimum on time of the main power switch, and the dynamic frequency shift signal is not enabled. During the next switching cycle an overcurrent condition is detected at time T2 during a minimum on period of the main power switch, thereby enabling the dynamic frequency shift signal. Using the function $2^N-1$ with N=1, one switching cycle is skipped. After skipping one switching cycle, the main power switch is enabled to conduct again at time T3, and an overcurrent condition is detected during a minimum on period of the main power switch, again enabling the dynamic frequency shift signal. Since an intervening switching cycle was not executed without detecting an overcurrent condition, the counter for N is incremented to 2, and using the function $2^N-1$, three switching cycles are now skipped. The process continues, skipping seven switching cycles at time T4 because an overcurrent condition is again consecutively detected during a minimum on period of the main power switch, and then 15 switching cycles are skipped at time T5 for the same reason, counting consecutive overcurrent detections. Thus, the dynamic frequency shift overcurrent protection process adaptively adjusts the operation of the power converter to prevent overcurrent runaway under a severe fault condition at the output terminals of the power converter, or during startup when output voltage is low while an output capacitor is being charged.

The ordinary termination in the prior art of a duty cycle for the main power switch at any time during a power converter switching cycle is retained in a preferred embodiment.

Figure 5:
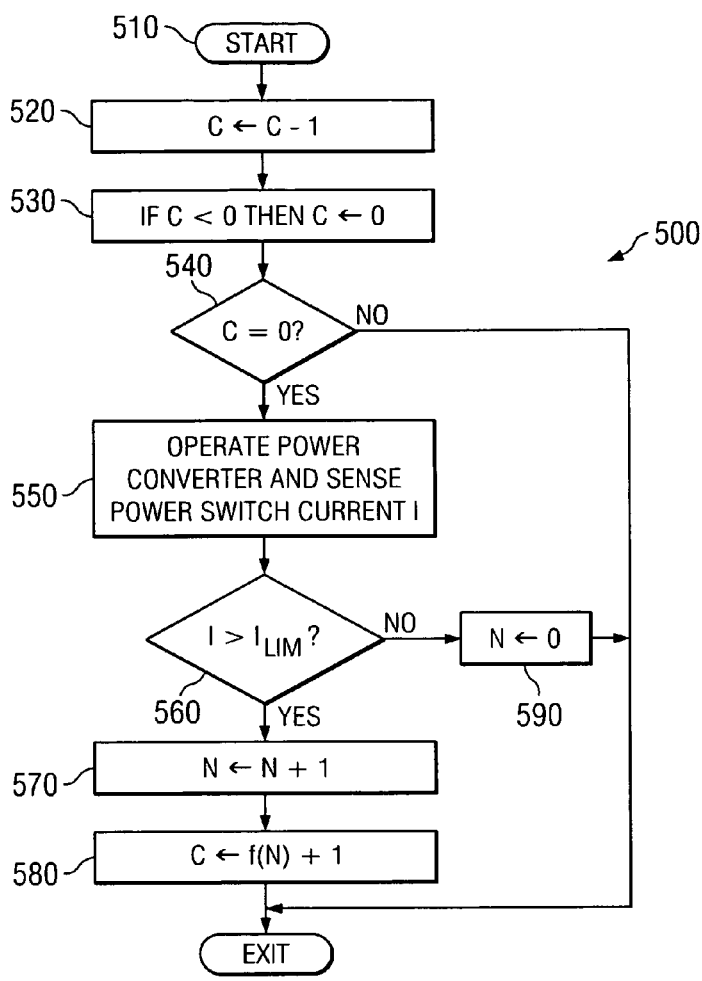
FIG. 5 illustrates a block diagram of a logic flow for an embodiment of an overcurrent protection process of the present invention.

Turning now to FIG. 5, illustrated is a block diagram of an embodiment of an overcurrent controller 500 for the dynamic frequency shift overcurrent protection process. The logic flow illustrated in FIG. 5 includes a count N of the number of consecutive times an overcurrent condition is detected in a power switch during a minimum on time of the power switch, and a count C of the number of switching cycles of the power converter that remain to be skipped after detection of an overcurrent condition during a minimum on time of the power switch. Both counts are assumed to be initialized to the value zero at startup of the power converter.

During each switching cycle of the power converter, the process begins at the block 510 labeled "Start". In block 520 the count C of the number of switching cycles of the power converter that remained to be skipped is decremented by one, and in block 530, values of C less than zero are prevented. In block 540, if the count C is not zero, i.e., if C is greater than zero, the process exits without turning on the power switch. The power switch is not turned on because power switching cycles are being skipped due to an overcurrent condition during a minimum on time of the power switch detected during an earlier switching cycle. If the count C is equal to zero in block 540, the logic continues in block 550, and a power converter switching cycle is enabled to operate while sensing current in a power switch during a minimum on time of the power switch. In block 560, if the sensed current in a power switch exceeds a current limit during a minimum on time of the power switch, the consecutive overcurrent count N is incremented by one in block 570. In block 580, the count of the remaining switching cycles to be skipped is computed. The integer "1" is added to the function f(N) to accommodate the logic represented in FIG. 5. The process then exits. However, if the sensed current does not exceed the current limit in block 560, then the count of consecutive overcurrent cycles is reset to zero in block 590, and the process exits.

In a preferred embodiment of the process represented in FIG. 5, when the power converter is operated in block 550 and a power switch current is sensed, if the sensed current is greater than the current limit, the present duty cycle is immediately terminated, even if the overcurrent condition was not detected during a minimum on time for a power switch. In a further embodiment, a current elsewhere in the circuit can be sensed rather than a power switch current, such as the current in an output inductor.

The logical flow illustrated in FIG. 5 can be implemented directly in a custom digital or mixed-signal integrated circuit using technology well understood in the art, or can be executed by a microprocessor or other processing method.

Figure 6:
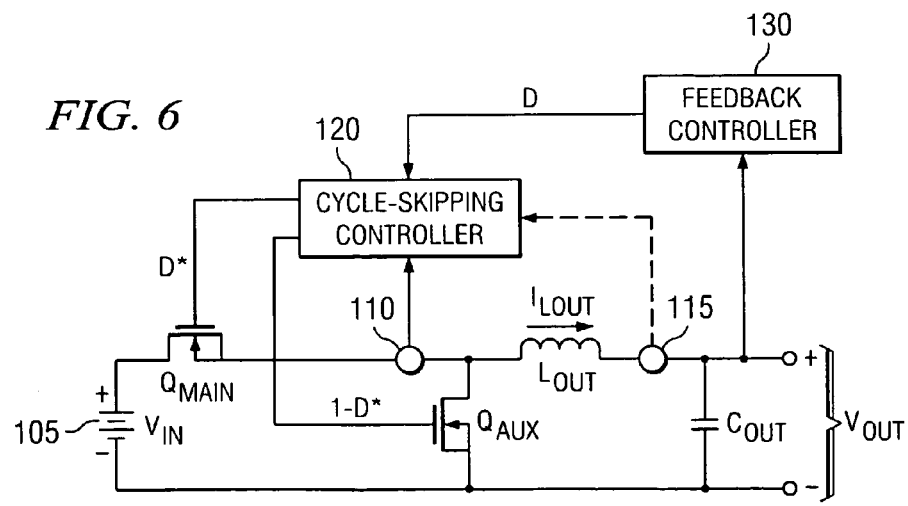
FIG. 6 illustrates a step-down switching regulator controlled by a cycle-skipping controller of the present invention.

Turning now to FIG. 6, illustrated is a simplified circuit diagram of a step-down switching regulator controlled by a cycle-skipping controller 120 of the present invention. The circuit elements in FIG. 6 that correspond to elements in FIG. 1 will not be redescribed in the interest of brevity. The circuit in FIG. 6 includes feedback controller 130 that senses the output voltage $V_{out}$ and produces a duty cycle D for the main power switch $Q_{main}$ to regulate the output voltage $V_{out}$ of the switching regulator. Alternatively, another characteristic of the switching regulator can be regulated such as an output current, or a combination of an output voltage and an output current. The circuit includes cycle-skipping controller 120 that is an implementation of the cycle-skipping logic as set forth above with reference to FIG. 5. The cycle-skipping controller selectively inhibits the power switch duty cycle D produced by the feedback controller 130 as necessary to produce the duty cycle D* to control the main power switch $Q_{main}$, and the complementary control signal 1–D* to control the auxiliary power switch $Q_{aux}$. A current in the main power switch $Q_{main}$ is sensed such as the current sensor 110 in the main power switch source lead during a minimum on time of the main power switch. Conduction of the main power switch is inhibited by the cycle-skipping controller 120 if the sensed current exceeds a current limit during the minimum on time, and during successive switching cycles as previously described. Alternatively, a current elsewhere in the circuit may be sensed such as by current sensor 115 in series with the output inductor $L_{out}$. Conduction of the main power switch may also be stopped if a sensed current exceeds a current limit beyond the minimum on time of a power switch as may be performed with an ordinary current limit circuit. Current sensing can be performed, for example, using a resistor in series with the power switch or elsewhere in the circuit, with a current-sense transformer with a resistor or other circuit element coupled to a transformer secondary winding, with a Hall-effect device, or by sensing voltage across a power switch, as is well understood in the art.

Although embodiments of the present invention and its advantages have been described in detail, it should be understood that various changes, substitutions and alterations can be made herein without departing from the spirit and scope of the invention as defined by the appended claims. For example, it will be readily understood by those skilled in the art that the circuits, circuit elements, and utilization of techniques to form the processes and systems providing overcurrent protection as described herein may be varied while remaining within the broad scope of the present invention.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A controller to provide overcurrent protection for a switched-mode power converter, comprising:
   circuitry for detecting a current in the power converter exceeding a current limit during substantially a minimum on time of a power switch;
   circuitry, coupled to the circuitry for detecting the current in the power converter for providing a count N of the number of consecutive times that the current in the power converter exceeds the current limit during substantially the minimum on time of the power switch; and
   circuitry, coupled to the circuitry for providing the count N, for inhibiting conduction of the power switch in the switched-mode power converter for a number of cycles that is a function of the count N, wherein the function is an increasing function of the count N, wherein the count N is also a count of the number of consecutive times that the circuitry for inhibiting conduction is enabled.

2. The controller according to claim 1, wherein the switched-mode power converter is a step-down buck regulator.

3. The controller according to claim 1, wherein the count N is reset to a starting value if the current in the power converter does not exceed the current limit substantially during the minimum on time of the power switch.

4. The controller according to claim 3, wherein the count N is reset to the value zero if the current in the power converter does not exceed the current limit substantially during the minimum on time of the power switch.

5. The controller according to claim 1, wherein the controller is implemented with an integrated circuit.

6. A switched-mode power converter with overcurrent protection, comprising:
   a controller comprising:
   a detector having an input coupled to the output of the power converter that detects a current in the power converter exceeding a current limit during substantially a minimum on time of a power switch and outputs an overcurrent signal;
   a counter coupled to the detector to receive the overcurrent signal, the detector providing a count N of the number of consecutive times that the current in the power converter exceeds the current limit during substantially the minimum on time of the power switch; and
   inhibiting circuitry coupled to the counter and receiving the count N, the inhibiting circuitry inhibiting conduction of the power switch in the switched-mode power converter for a number of cycles that is a function of the count N, wherein the function of the count N is an increasing function of the count N, wherein the count N is also a count of the number of consecutive times that the inhibiting circuitry is enabled.

7. The switched-mode power converter according to claim 6, wherein the switched-mode power converter is a step-down buck regulator.

8. The switched-mode power converter according to claim 6, wherein the count N is reset if the current in the power converter does not exceed the current limit substantially during the minimum on time of the power switch.

9. The switched-mode power converter according to claim 8, wherein the count N is reset to the value zero if the current in the power converter does not exceed the current limit substantially during the minimum on time of the power switch.

10. The switched-mode power converter according to claim 6, wherein the controller is implemented with an integrated circuit.

11. A method of providing overcurrent protection for a switched-mode power converter, comprising:
    detecting a current in the power converter exceeding a current limit during substantially a minimum on time of a power switch;

counting the number of consecutive times N that the current in the power converter exceeds the current limit during substantially the minimum on time of the power switch; and inhibiting conduction of the power switch in the switched-mode power converter for a number of cycles that is a function of the count N, wherein the function of the count N is an increasing function of the count N, wherein the count N is also a count of the number of consecutive times that conduction of the power switch is inhibited.

12. The method according to claim 11, including constructing the switched-mode power converter as a step-down buck regulator.

13. The method according to claim 11, including resetting the count N to a starting value if the current in the power converter does not exceed the current limit substantially during the minimum on time of the power switch.

14. The method according to claim 13, including resetting the count N to the value zero if the current in the power converter does not exceed the current limit substantially during the minimum on time of the power switch.

15. The method according to claim 11, including implementing the controller with an integrated circuit.

* * * * *